United States Patent
Offenhaeuser et al.

(10) Patent No.: US 10,576,985 B2
(45) Date of Patent: Mar. 3, 2020

(54) METHOD AND DEVICE FOR OPERATING A DRIVER ASSISTANCE SYSTEM, AND DRIVER ASSISTANCE SYSTEM

(71) Applicant: Robert Bosch GmbH, Stuttgart (DE)

(72) Inventors: Andreas Offenhaeuser, Marbach am Neckar (DE); Erik Lesser, Steinheim (DE); Martin Kieren, Marbach (DE); Nils Hagenlocher, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 270 days.

(21) Appl. No.: 15/802,920

(22) Filed: Nov. 3, 2017

(65) Prior Publication Data

US 2018/0126997 A1 May 10, 2018

(30) Foreign Application Priority Data

Nov. 9, 2016 (DE) .................. 10 2016 221 975

(51) Int. Cl.

| G08G 1/00 | (2006.01) |
| B60W 40/068 | (2012.01) |
| G08G 1/01 | (2006.01) |
| G08G 1/0967 | (2006.01) |
| B60W 10/18 | (2012.01) |

(52) U.S. Cl.
CPC .......... *B60W 40/068* (2013.01); *B60W 10/18* (2013.01); *G08G 1/0112* (2013.01); *G08G 1/0129* (2013.01); *G08G 1/0141* (2013.01); *G08G 1/09675* (2013.01); *G08G 1/096716* (2013.01); *G08G 1/096741* (2013.01); *G08G 1/096775* (2013.01); *G08G 1/096791* (2013.01); *B60W 2550/148* (2013.01)

(58) Field of Classification Search
USPC .......................................................... 701/74
See application file for complete search history.

(56) References Cited

U.S. PATENT DOCUMENTS

| 9,340,211 B1 * | 5/2016 | Singh ................. B60W 40/068 |
| 10,275,662 B1 * | 4/2019 | Askeland ........... G06K 9/00791 |
| 2019/0193697 A1 * | 6/2019 | Tenbrock ............... B60T 8/172 |

* cited by examiner

*Primary Examiner* — James M McPherson
(74) *Attorney, Agent, or Firm* — Norton Rose Fulbright US LLP; Gerard Messina

(57) ABSTRACT

A method for operating a driver assistance system for motor vehicles, which each include multiple wheels in contact with a roadway, at least one of the motor vehicles ascertaining at least one instantaneous friction coefficient between at least one of the wheels and the roadway with the aid of at least one friction coefficient model, and at least one driver assistance unit of the respective motor vehicle being set or calibrated as a function of the ascertained friction coefficient. It is provided that the ascertained friction coefficient is transmitted to a central database, and that the database provides the ascertained friction coefficient to the other motor vehicles.

18 Claims, 2 Drawing Sheets

METHOD AND DEVICE FOR OPERATING A DRIVER ASSISTANCE SYSTEM, AND DRIVER ASSISTANCE SYSTEM

CROSS REFERENCE

The present application claims the benefit under 35 U.S.C. § 119 of German Patent Application No. DE 102016221975.8 filed on Nov. 9, 2016, which is expressly incorporated herein by reference in its entirety.

BACKGROUND INFORMATION

The present invention relates to a method for operating a driver assistance system for motor vehicles, which each include multiple wheels in contact with a roadway, at least one of the motor vehicles ascertaining at least one instantaneous friction coefficient between at least one of the wheels and the roadway with the aid of at least one friction coefficient model, and at least one driver assistance unit of the respective motor vehicle being set or calibrated as a function of the ascertained friction coefficient.

The present invention furthermore relates to a driver assistance system including a corresponding device.

BACKGROUND INFORMATION

Modern driver assistance systems, such as lane keeping systems, automatic braking systems and the like, generally have a plurality of units for ascertaining an in particular instantaneous friction coefficient between wheels of the motor vehicle and the roadway. These so-called friction coefficient estimators are very specifically designed for different driver assistance units and are independent of one another. This has advantages with respect to the availability of the signals and the optimal design of the driver assistance system, and in particular of the individual driver assistance units of the driver assistance system. The respective unit includes a friction coefficient model, which may be formed by software and/or by hardware, and a sensor, which provides an input signal for the friction coefficient model. As a function of the input signal, the friction coefficient model determines the respective friction coefficient as an output signal. The driver assistance system is set or calibrated as a function of the ascertained friction coefficient in order to be able to respond optimally in an instantaneous driving situation, for example in order to initiate a safe braking process or to maximally brake wheels of the motor vehicle individually when negotiating curves without loss of static friction.

SUMMARY

An example method according to the present invention may have the advantage that the friction coefficient ascertainment is not limited to a single motor vehicle, but rather is provided to multiple motor vehicles. In particular, the friction coefficients ascertained by each of the multiple motor vehicles are collected and evaluated by a central database, which determines a valid friction coefficient, for example, from the ascertained friction coefficient and provides it to the motor vehicles. In particular, the central database creates a friction coefficient map from the collected ascertained friction coefficients, the friction coefficient map containing instantaneous friction coefficients or friction coefficients presently determined to be valid. For the respective motor vehicle, the driver assistance system preferably ascertains an instantaneous position of the respective motor vehicle, in particular with the aid of a respective navigation system, and transmits it together with the respectively ascertained friction coefficient or friction coefficients to the central database, which determines a valid friction coefficient for the respective position from the plurality of friction coefficients which may have been ascertained for this position. The central database communicates, for example, with the respective motor vehicle via a mobile communication link, so that the corresponding pieces of information may be promptly transmitted to the database, or from the database to the respective motor vehicle, so that the driver assistance system of the respective motor vehicle is optimally set and/or calibrated as a function of the ascertained friction coefficient or of the friction coefficient declared to be valid by the database. According to the present invention, it is provided for this purpose that the ascertained friction coefficient is transmitted to the central database, and that the central database provides the ascertained friction coefficient to the other motor vehicles. The provision in particular takes place in that the ascertained friction coefficients of the database may be retrieved by a query of the respective motor vehicle. Alternatively, the database transmits the present friction coefficients or a present friction coefficient map to the motor vehicles of the driver assistance system in an automated manner.

In particular, it is provided that at least one driver assistance unit of the respective motor vehicle is set or calibrated with the aid of the ascertained friction coefficient, in particular with the aid of the ascertained friction coefficient provided by the database. The calibration or optimization of the driver assistance system thus takes place locally in the respective motor vehicle itself. In particular, the setting or calibrating takes place as a function of a friction coefficient which was, in particular, declared to be valid by the central database.

Furthermore, it is preferably provided that multiple simultaneously or almost simultaneously ascertained friction coefficients are compared to one another by the central database in order to determine at least one valid friction coefficient, which is provided to the driver assistance units of the multiple motor vehicles for setting or calibration. This has the advantage that, while the independence of the friction coefficient ascertainment is preserved, the ascertained friction coefficients are correlated with one another to be able to optimally set or calibrate the driver assistance system, in particular at least one or multiple driver assistance units. This in particular yields the advantage that the error-proneness of friction coefficient estimators is reduced or taken into consideration in order to determine the most plausible friction coefficient. According to the present invention, this is achieved in that the driver assistance system includes multiple of the described units, that friction coefficients are ascertained with the aid of the multiple units, that simultaneously or almost simultaneously ascertained friction coefficients are compared to one another, that at least one valid friction coefficient of the friction coefficients is determined with the aid of the comparison, and that the driver assistance system is set or calibrated as a function of the valid friction coefficient.

Furthermore, it is preferably provided that at least one motor vehicle ascertains multiple friction coefficients with the aid of multiple friction coefficient models, and that simultaneously or almost simultaneously ascertained friction coefficients of the vehicle are compared to one another, that at least one valid friction coefficient of the friction coefficients of the motor vehicle is determined with the aid of the comparison, and that the driver assistance unit of the motor vehicle is set or calibrated as a function of the valid friction coefficient and/or the valid friction coefficient is transmitted to the central database. This yields the advantage that the friction coefficients may be directly ascertained locally at the motor vehicle and compared to one another in order to determine a local valid friction coefficient. This friction coefficient may then be used in addition to or as an alternative to the friction coefficients provided by the database for calibrating or setting the respective driver assistance unit.

According to one preferred refinement of the present invention, it is provided that the origin of the respective friction coefficient, i.e., the unit determining the friction coefficient, is taken into consideration in the comparison of the friction coefficients. In this way, for example, the algorithm of the friction coefficient model for calculating the friction coefficient or the type of the input signal or of the sensor for determining the performance capability or accuracy of the friction coefficient estimator is taken into consideration. This offers, and preferably also utilizes, the option of taking the plausibility of the respective friction coefficient into consideration in the comparison of the friction coefficients and of thus weighting individual friction coefficients more strongly than others in the comparison, for example, in order to obtain a preferably reliable friction coefficient determination. Preferably, it is provided that initially a valid friction coefficient range is determined from the friction coefficients. This range is in particular limited by an ascertained maximum friction coefficient and an ascertained minimum friction coefficient, the maximum friction coefficient and the minimum friction coefficient preferably being varied as a function of the further ascertained friction coefficients and/or present ambient conditions, as is described in greater detail below.

Furthermore, it is preferably provided that an errorproneness of the ascertained friction coefficient is determined as a function of which of the units ascertains the respective friction coefficient, and is taken into consideration in the comparison. The different friction coefficient estimators or units have differing error-proneness, for example due to the input signal. By taking these into consideration, an optimal determination of one or multiple valid friction coefficients or of the valid friction coefficient range is ensured.

Furthermore, it is preferably provided that least one ambient condition is detected, and that the error-proneness is determined as a function of the detected ambient condition. In this way, it is taken into consideration that, for example, the input signal which is supplied by a sensor may change with changing ambient conditions at the same actual friction coefficients. For example, a change in temperature or a change in humidity may affect the input signal and thereby impair the error-proneness or plausibility of an ascertained friction coefficient.

Ambient conditions which are monitored are preferably an outside temperature, a humidity, a roadway condition and/or a tire age of at least one of the wheels. These ambient conditions affect both the measured value of a sensor and the actual friction coefficient, and thus help ascertain the respective friction coefficient.

Furthermore, it is preferably provided that least one friction coefficient is determined as a function of an instantaneous outside temperature, a windshield wiper activity, a window pane opening, an inside temperature, a ventilation system activity or air conditioning system activity. This friction coefficient determination thus takes place independently of the actual driving characteristic of the motor vehicle and is rather based on so-called soft factors, which provide an indication of the ambient conditions of the motor vehicle, from which it is possible to ascertain whether the friction coefficient, for example, is in a first range having high friction coefficients or a second range having low friction coefficients. As a result of this type of friction coefficient ascertainment, a friction coefficient is thus roughly estimated or pre-estimated. In this way, other friction coefficients which are based on the data of the sensors are subjected to a plausibility check.

According to one preferred refinement of the present invention, it is provided that at least one of the friction coefficients is determined as a function of data of a navigation system. The prerequisite for this is that pieces of information about the roadway condition are also stored in the navigation system. By taking the stored roadway condition into consideration, a presently acting maximum friction coefficient may be determined, in particular with knowledge of a tire used on the particular wheel. In particular, a friction coefficient change may be predicted or promptly ascertained or subjected to a plausibility check using the data of the navigation system.

Furthermore, it is preferably provided that at least one of the friction coefficients is ascertained as a function of an instantaneous driving characteristic of the motor vehicle. To ascertain the driving characteristic, for example, a longitudinal acceleration, a transverse acceleration, a rotation rate and/or a yaw rate of the motor vehicle and an instantaneous driving speed of the motor vehicle are monitored. Preferably, an instantaneous steering angle, the activity of a braking system and/or a required driving torque are also monitored. The driving characteristic of the motor vehicle in an instantaneous driving situation may be ascertained from all these values. With knowledge of the aforementioned values, it is possible, in particular, to determine an anticipated driving characteristic, which is compared to an actually present driving characteristic. If, for example, the detected longitudinal acceleration deviates from an anticipated longitudinal acceleration which results from an active state of the braking system, it is thereupon recognized that a higher or lower friction coefficient than actually anticipated is present. Accordingly, this friction coefficient may be adapted and determined.

Furthermore, it is preferably provided that least one of the friction coefficient models is calibrated or corrected as a function of the valid friction coefficient. In this way, an intervention in the respective unit takes place as a function of the ascertained valid friction coefficient. As a result, a so-called online calibration may be carried out during the driving operation of the motor vehicle, which ensures that the respective friction coefficient model always operates optimally.

According to one preferred refinement of the present invention, it is provided that at least one of the ascertained friction coefficients is determined as a function of a chronological progression, and that an interference factor influencing the validity of the respective friction coefficient is determined as a function of at least one of the detected ambient conditions. It is thus ascertained which one is the interference factor decisively influencing the respective friction coefficient. With knowledge of this interference factor, a friction coefficient calibration or the correction/setting of a driver assistance system or a driver assistance unit may then optimally take place, for example in that the interference factor is monitored and a prompt adjustment of the friction coefficient ascertainment takes place.

Furthermore, it is preferably provided that the respectively ascertained friction coefficient and/or the valid friction coefficient is/are transmitted to a central database. A central database is understood to mean an in particular stationary unit which is present separately from the vehicle and communicates with it, for example via a mobile communication network, in order to receive the ascertained friction coefficients of the vehicle, in particular the ascertained friction coefficients of a plurality of vehicles. The central database forms a component of the driver assistance system which is situated outside the respective motor vehicle. In this respect, it is possible to speak of a local driver assistance system, which refers solely to the motor vehicle, and a global driver assistance system, which includes the central database and the driver assistance units of a plurality of vehicles. The central database evaluates the received friction coefficients to determine a valid friction coefficient. The database, in particular, takes into consideration from which vehicle it received the respective friction coefficients and in which location the vehicle was situated during the ascertainment of the respective friction coefficient. In this way, preferably a friction coefficient map is generated, which forms geographical regions having different available friction coefficients, for example. Advantageously, the central database transmits a valid friction coefficient or friction coefficient range, which results from the preceding ascertainment and the comparison of the received friction coefficients, back to the motor vehicle or motor vehicles, which then calibrate or set their driver assistance units as a function of the received data. For the exchange of the data, in particular a so-called cloud service is utilized, to which a plurality of motor vehicles and, if necessary, also multiple central/stationary databases have access to obtain a preferably complete friction coefficient map. The database preferably additionally creates a friction coefficient map including estimated friction coefficients based on roadway data, for example of a navigation system, in order to provide these an accordingly estimated friction coefficient, for example as a valid friction coefficient, as a function of the position of the respective motor vehicle. The database preferably also takes present weather data into consideration in order to vary or to optimize the ascertained friction coefficient as a function of present ambient conditions at the location of the respective motor vehicle. A database shall in particular be understood to mean a processing center, which includes a processing device and a data memory, and a communication device for the wireless communication with the motor vehicles.

An example device according to the present invention includes a control unit that is specifically configured to carry out the method according to the present invention when used as intended. This results in the aforementioned advantages.

An example driver assistance system according to the present invention may include a device according to the present invention. This also results in the aforementioned advantages. The driver assistance system for the motor vehicle preferably includes at least one, preferably multiple driver assistance units, which are set or calibrated as a function of one or multiple determined valid friction coefficients, as described above. The driver assistance system in the design as a global driver assistance system furthermore preferably includes at least one central database, which receives the friction coefficients of multiple motor vehicles and, from these, determines one or multiple valid friction coefficients and provides it or them to the motor vehicles. In particular, the database is designed to generate a friction coefficient map, which in particular is provided completely or in parts to the motor vehicles to enable a prompt calibration/setting of the respective driver assistance unit or of the driver assistance system.

The present invention is to be described in greater detail hereafter based on the figures.

DETAILED DESCRIPTION OF EXAMPLE EMBODIMENTS

Figure 1:
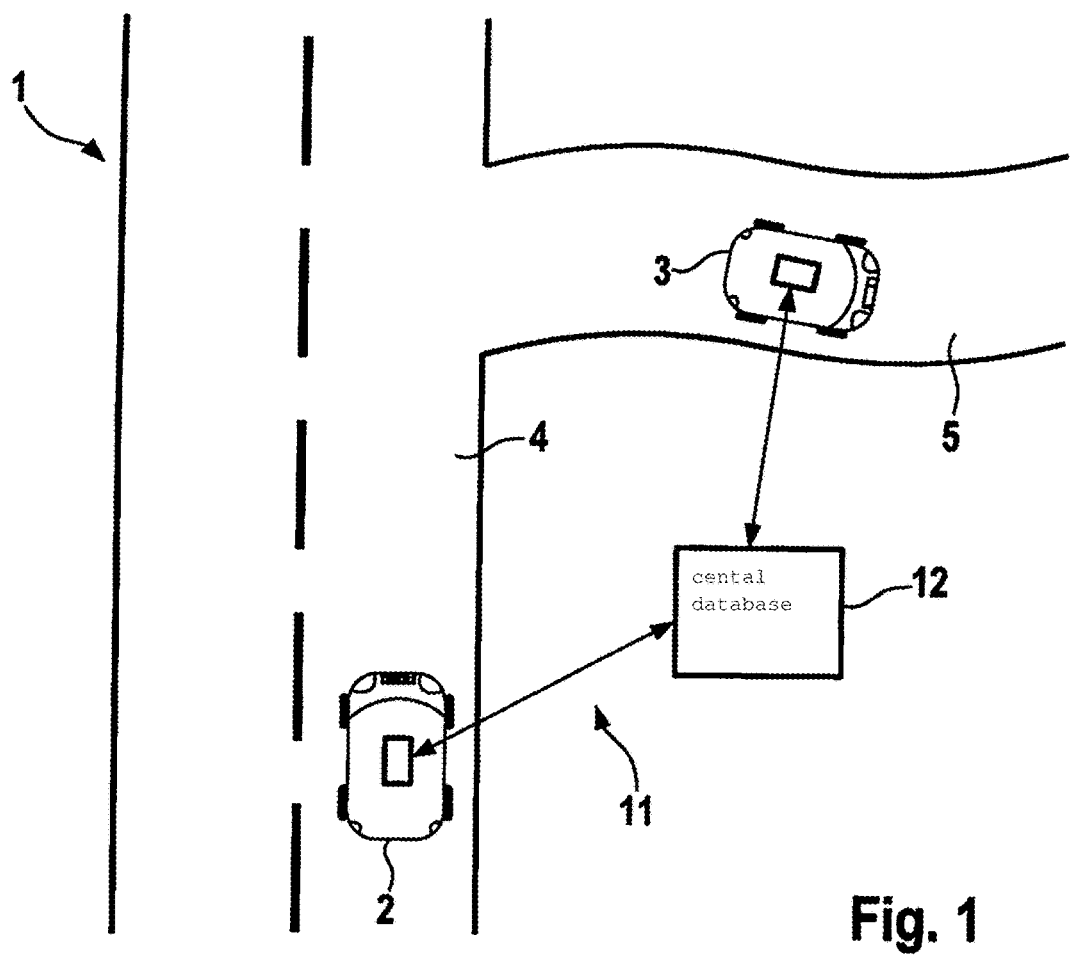
FIG. 1 shows a driver assistance system for motor vehicles in a simplified illustration.

FIG. 1, in a simplified representation, shows a driver assistance system 1 for motor vehicles. For this purpose, FIG. 1 shows multiple motor vehicles 2 and 3, which are situated on different roadways 4 and 5. Roadways 4 and 5 differ in their roadway condition, presently roadway 4 being a paved road and roadway 5 being a gravel road.

Figure 2:
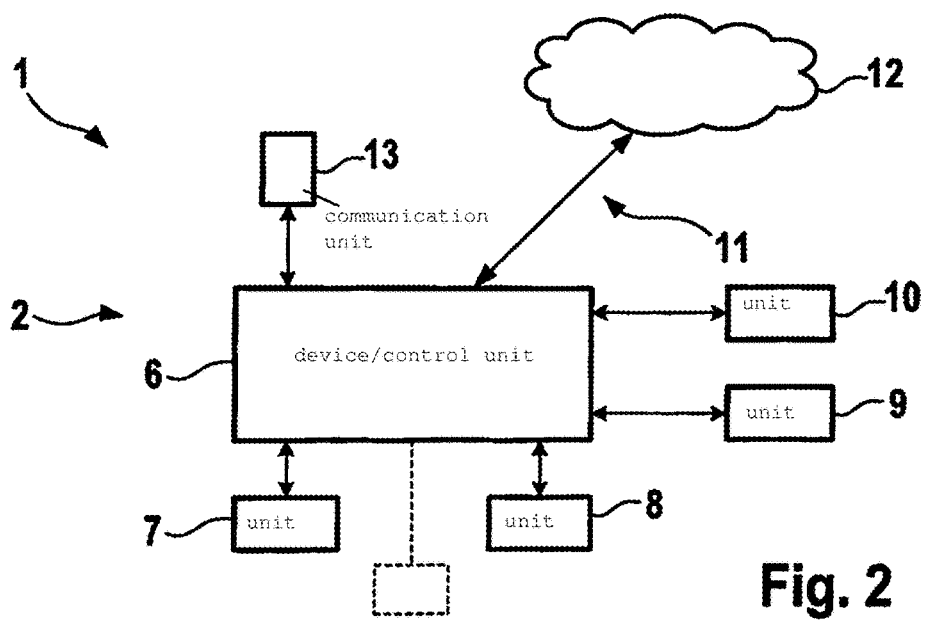
FIG. 2 shows the driver assistance system in a simplified detailed illustration.

FIG. 2 shows a schematic illustration of one of motor vehicles 2. Preferably, however, what is described hereafter for all motor vehicles which operate with driver assistance system 1 or are part of driver assistance system 1 applies to motor vehicle 2. Motor vehicle 2 includes a device 6, in particular in the form of a control unit, which is connected to multiple units 7, 8, 9 and 10. Units 7 through 10 have in common that they each include a sensor and a friction coefficient model, which receives an output signal of the respective sensor as an input signal. With the aid of the friction coefficient model, the respective unit 7, 8, 9, 10 determines an instantaneous friction coefficient between at least one of the wheels of motor vehicle 2 and roadway 4 or 5.

For example, unit 7 is designed as an EPS system, which detects pieces of information of toothed rack forces of an electrical/electronic power steering system and thereby derives a friction coefficient.

Unit 8 is presently an ABS braking system or control unit, for example, which determines a friction coefficient from pieces of slip information of one or multiple wheels.

Unit 9 is presently designed as a traction control system (TCS), which determines a friction coefficient, also as a function of slip values at the wheels.

Unit 10 is presently designed as an electronic stability program/unit (ESP), which carries out wheel-specific braking processes by stabilizing the driving characteristic of motor vehicle 2. Unit 10 detects a present friction coefficient, for example as a function of wheel speeds.

Device 6 may also be connected to further devices, as shown by the dotted line, which include a friction coefficient model in one way or another in order to determine an instantaneous friction coefficient.

Presently, units 7, 8, 9 and 10 are driver assistance units at the same time, which assist the driver in driving motor vehicle 2, and in particular ensure driving safety. For this purpose, units 7, 8, 9, 10 initiate measures as needed, such as wheel-individual braking processes, to adapt the driving stability of motor vehicle 2. The driver assistance systems operate optimally when the instantaneous friction coefficient between the wheels of the motor vehicle and roadway 4 or 5 is known. For this purpose, the friction coefficient models are utilized, so that the respective driver assistance system may be optimally set or calibrated using the respective instantaneously determined friction coefficient.

The method described hereafter is now carried out by device 6, which is in particular designed as a control unit or includes such a unit.

Device 6 receives the friction coefficients ascertained with the aid of the respective friction coefficient models by retrieving these or in that these are provided or transmitted automatically to the control unit. Device 6 correlates the individual friction coefficients with one another by comparing these to one another, the origin of the respective friction coefficient and its error-proneness, in particular as a function of present ambient conditions, being taken into consideration in the comparison.

The method may be supplied with friction coefficients of different classes. For example, it is possible to consider friction coefficients which depend on soft factors, such as the outside temperature, a windshield wiper activity, a window pane opening, an inside temperature, an air conditioning system activity, a ventilation system activity or a seat heater activity. From this, a friction coefficient, in particular a friction coefficient index $\mu_B$ may be ascertained. In particular, a friction coefficient range, which is likely for the present ambient conditions, may be determined as a function of the described soft factors.

Another class of friction coefficients may be derived from the driving characteristic of motor vehicle 2 and indicates at least one friction coefficient which is instantaneously used, and thus is available at least on present roadway 4 or 5. This instantaneous friction coefficient $\mu_{MIN}$ may be calculated, for example, from the acceleration of the motor vehicle using the following formula:

$$\mu_{MIN} = \frac{\sqrt{a_x^2 + a_y^2}}{9.81 \frac{m}{s^2}}$$

$a_x$ being the acceleration of motor vehicle 2 in the longitudinal direction, and $a_y$ being the acceleration of the motor vehicle in the transverse direction. The relationship from the formula applies in approximation for all motor vehicles whose normal force is not increased by their dynamic measures, such as spoilers.

When a friction coefficient is ascertained by a driver assistance system during an active intervention, such as by the ESP system, a maximum available friction coefficient $\mu_{MAX}$ is ascertained/determined.

With the aid of a skillful interpretation of these values, a differing quality of aggregate friction coefficients may be created, as is to be described in greater detail based on FIG. 3. The goal is to determine the friction coefficient in a curve preferably precisely with the aid of the method.

Figure 3A:
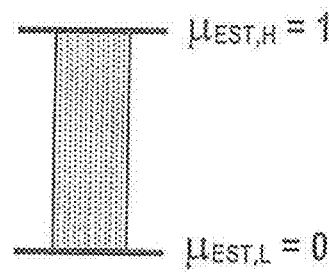
FIG. 3A shows an exemplary friction coefficient determination of the driver assistance system.

At point in time $t_0$, no data whatsoever for the present road segment or present road section are available yet. The possible friction coefficient $\mu_{EST}$ is thus in the full range from 0 to 1 $\mu$, as shown in FIG. 3A.

Figure 3B:
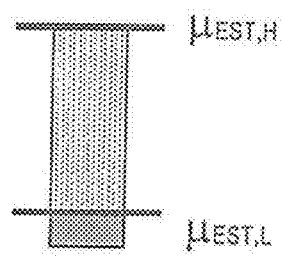
FIG. 3B shows an exemplary friction coefficient determination of the driver assistance system.

When the vehicle accelerates, for example at 2 m/s², without a control intervention from the traction control unit (unit 8) taking place, a minimum friction coefficient $\mu_{MIN}$ of 0.2 is thus ascertained, and the lowest possible friction coefficient $\mu_{EST,L}$ is set to 0.2, as shown in FIG. 3B. The possible friction coefficient $\mu_{EST}$ has thus been limited to a range of 0.8.

Figure 3C:
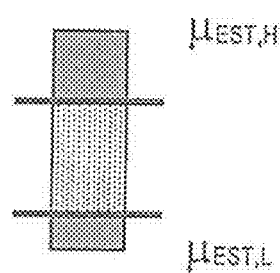
FIG. 3C shows an exemplary friction coefficient determination of the driver assistance system.

If it is detected due to an active windshield wiper and/or rain sensor that presently there is precipitation, the friction coefficient hypothesis is limited further. Since the friction coefficient decreases with increasing precipitation, the maximum possible friction coefficient $\mu_{EST,H}$ is thus set, for example, to 0.7, for example during heavy precipitation, which is quantitatively detectable by the rain sensor, as shown in FIG. 3C.

If cold, i.e., a low outside temperature, in particular below the freezing point, is now also added to the precipitation, and the motor vehicle is moved across a bridge, for example, on which black ice occurs or may occur, the precision of the available friction coefficient $\mu_{EST}$ may be further improved. The driving on the bridge is recognized, for example, based on data of a navigation system of motor vehicle 2. The outside temperature is preferably continuously monitored as the ambient temperature.

Figure 3D:
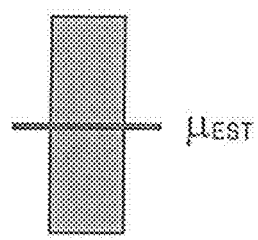
FIG. 3D shows an exemplary friction coefficient determination of the driver assistance system.

During an active intervention of the ESP system (unit 8), multiple friction coefficient models of driver assistance system 1 estimate the instantaneous friction coefficient on at least one of the wheels of motor vehicle 2. In a safe interpretation of the friction coefficient aggregation, the smallest of all estimated friction coefficients is determined as the valid friction coefficient to offer the highest possible safety. Since this information contains exact friction coefficient information, the range limits for the possible friction coefficients $\mu_{EST,L}$ and $\mu_{EST,H}$ are dispensed with and may be replaced with valid friction coefficient $\mu_{EST}$, which corresponds to the minimum estimated friction coefficient of all friction coefficient models, as shown in FIG. 3D.

If this method is not carried out for each motor vehicle 2, 3, but always based on the present position at which the friction coefficients are ascertained or determined, a globally available friction coefficient map may thus be created, which at every point provides a valid friction coefficient with a certain confidence.

Advantageously, as mentioned above, the error-proneness of the friction coefficient models is also taken into consideration in the comparison of the friction coefficients for the determination of a valid friction coefficient. For this purpose, for example, an outside temperature or the age of a tire of one of the wheels of the motor vehicle is ascertained to subject the estimation accuracy of the respective friction coefficient model to a plausibility check. With the knowledge as to which friction coefficient models are prone to which errors, and monitoring the relevant ambient conditions, it is identified when individual friction coefficient models run the risk of supplying implausible values. If it is recognized, for example, that one of the friction coefficient models does not supply a reliable friction coefficient due to a relevant ambient condition, such as a particularly low temperature, this friction coefficient is discarded for further use, or the affected friction coefficient model is reset or recalibrated, in particular as a function of a friction coefficient declared to be valid.

By monitoring the progression or the history of individual friction coefficients with respect to one another, it is moreover possible to quantify or recognize disturbance variables and have central device 6 communicate this to central units 7, 8, 9, 10.

As shown in FIG. 2, device 6 or the respective motor vehicle 2 may furthermore communicate via a communication system 11 with a central database 12 (processing center), as provided as a stationary unit in FIG. 1 and as a cloud service in FIG. 2. It is in particular provided that each motor vehicle 2, 3 transmits the friction coefficients it has ascertained, in particular the friction coefficients determined to be valid, to central database 12, which, in turn, provides these to other motor vehicles. If, for example, the preceding motor vehicle 3 ascertains a lower friction coefficient on roadway 5, it communicates this to database 12 after determination of a valid friction coefficient. This friction coefficient is, in turn, provided to motor vehicle 2, which, as soon as it turns onto roadway 5, has this friction coefficient available without initially having to ascertain it itself. The prerequisite for this is, of course, that both motor vehicles 2, 3 are able to determine their positions with the aid of an in particular satellite-based navigation system. In addition or as an alternative, device 6 is furthermore connected to a communication unit 13, which, for example, carries out the communication with database 12 or in particular is designed as a vehicle-to-vehicle communication unit, in order to exchange or be able to exchange friction coefficient data directly with the motor vehicles in the indirect or direct vicinity of motor vehicle 2.

According to one further exemplary embodiment, it is provided that central database 12 itself carries out the determination of valid friction coefficients as a function of the friction coefficients ascertained by the friction coefficient estimators of the respective motor vehicle 2, 3 or by units 7, 8, 9, 10, so that the computing complexity is at least partially shifted from the respective motor vehicle 2, 3 into external database 12.

What is claimed is:

1. A method for operating a driver assistance system for motor vehicles, each of the motor vehicles including multiple wheels in contact with a roadway, the method comprising:
ascertaining, by a first motor vehicle of the motor vehicles, multiple friction coefficients between at least one wheel of the first motor vehicle and a roadway, the multiple friction coefficients being ascertained by the first motor vehicle using a different respective friction coefficient model, relative to one another;
comparing, by the first motor vehicle, the ascertained multiple friction coefficients to one another, and ascertaining a first plausible friction coefficient based on the comparing;
setting or calibrating at least one driver assistance unit of the first motor vehicle as a function of the ascertained first plausible friction coefficient; and
transmitting, by the first motor vehicle, the ascertained first plausible friction coefficient to a central database, the central database providing the ascertained first plausible friction coefficient to other motor vehicles of the motor vehicles.

2. The method as recited in claim 1, wherein central database receives multiple ascertained friction coefficients from the motor vehicles, and the central database compares the multiple ascertained friction coefficients to one another to determine a second plausible friction coefficient, which is provided to respective driver assistance units of the motor vehicles for setting or calibrating the respective driver assistance units.

3. The method as recited in claim 1, wherein the multiple friction coefficients are simultaneously ascertained by the first motor vehicle.

4. The method as recited in claim 1, wherein the first motor vehicle also ascertains the first plausible friction coefficient based on origins of the multiple friction coefficients.

5. The method as recited in claim 1, wherein the first motor vehicle includes multiple units, each of the multiple units ascertaining a different one of the multiple friction coefficients, the first motor vehicle determining an error-proneness of each respective friction coefficient of the multiple friction coefficients as a function of which of the units ascertained the respective friction coefficient, and wherein the motor vehicle ascertains the first plausible friction coefficient based on the determined error-proneness of each respective friction coefficient.

6. The method as recited in claim 5, wherein at least one ambient condition is detected, and the error-proneness is determined as a function of the detected at least one ambient condition.

7. The method as recited in claim 6, wherein the at least one ambient condition is monitored by the first motor vehicle, and the at least one ambient condition includes at least one of an outside temperature, a humidity, a roadway condition, and a tire age of at least one wheel of the first motor vehicle.

8. The method as recited in claim 1, wherein at least one of the multiple friction coefficients is ascertained as a function of one of an temperature outside the first motor vehicle, a windshield wiper activity of the first motor vehicle, a window pane opening of the first motor vehicle, an inside temperature of the first motor vehicle, a ventilation system activity of the first motor vehicle, or air conditioning system activity of the first motor vehicle.

9. The method as recited in claim 1, wherein at least one of the multiple friction coefficients is ascertained as a function of data of a navigation system of the first motor vehicle.

10. The method as recited in claim 1, wherein one of the multiple friction coefficients is ascertained using the following formula:

$$\mu_{MIN} = \frac{\sqrt{a_x^2 + a_y^2}}{9.81 \frac{m}{s^2}}$$

wherein $\mu_{MIN}$ is the one of the multiple friction coefficients, $a_x$ is an acceleration of the first motor vehicle in a longitudinal direction of the first motor vehicle, and $a_y$ is an acceleration of the first motor vehicle in a traverse direction of the motor vehicle.

11. The method as recited in claim 1, wherein at least one of the different respective friction coefficient models is calibrated, or corrected, or both calibrated and corrected, as a function of the first plausible friction coefficient.

12. The method as recited in claim 1, wherein the first motor vehicle includes multiple units, each of the multiple units ascertaining a different one of the multiple friction coefficients, at least one of the multiple friction coefficients is determined as a function of a chronological progression of friction coefficients ascertained by at least one of the multiple units over time, and an interference factor influencing plausibility of the one of the multiple friction coefficients is determined as a function of at least one detected ambient condition.

13. A device for operating a driving assistance system for motor vehicles, each of the motor vehicles including multiple wheels in contact with a roadway, a first motor vehicle of the multiple motor vehicles including multiple units situated in a first motor vehicle of the motor vehicles, configured to ascertain multiple friction coefficients, wherein each of the multiple units: (i) includes a different respective friction coefficient model, relative to one another, and (ii) ascertains a different one of the multiple friction coefficients using the different respective friction coefficient model, the device comprising:

a control unit situated in the first motor vehicle, the control unit configured to compare the ascertained multiple friction coefficients to one another, and ascertain a first plausible friction coefficient based on the comparing, the control unit further configured to set or calibrate at least one driver assistance unit of the first motor vehicle as a function of the ascertained first plausible friction coefficient, and to transmit the ascertained first plausible friction coefficient to a central database, the central database providing the ascertained first plausible friction coefficient to other motors of the motor vehicles.

14. A device for operating a driving assistance system for motor vehicles, each of the motor vehicles including multiple wheels in contact with a roadway, the device comprising:

multiple units situated in a first motor vehicle of the motor vehicles, configured to ascertain multiple friction coefficients, wherein each of the multiple units: (i) includes a different respective friction coefficient model, relative to one another, and (ii) ascertains a different one of the multiple friction coefficients using the different respective friction coefficient model;

a control unit situated in the first motor vehicle, the control unit configured to compare the ascertained multiple friction coefficients to one another, and ascertain a first plausible friction coefficient based on the comparing, the control unit further configured to set or calibrate at least one driver assistance unit of the first motor vehicle as a function of the ascertained first plausible friction coefficient, and to transmit the ascertained first plausible friction coefficient to a central database, the central database providing the ascertained first plausible friction coefficient to other motors of the motor vehicles.

15. The method as recited in claim 1, wherein the first motor vehicle includes multiple units, each of the multiple units ascertaining a different one of the multiple friction coefficients.

16. The method as recited in claim 1, wherein the multiple friction coefficients are also ascertained using a different respective sensor of the first motor vehicle, relative to one another.

17. The device as recited in claim 13, wherein each of the multiple units includes a different respective sensor of the first motor vehicle, relative to one another, and each of the multiple units is configured to ascertain the different one of the multiple friction coefficients using the different respective sensor.

18. The device as recited in claim 14, wherein each of the multiple units includes a different respective sensor of the first motor vehicle, relative to one another, and each of the multiple units is configured to ascertain the different one of the multiple friction coefficients using the different respective sensor.

\* \* \* \* \*